March 8, 1966  W. W. CASE  3,239,055
AUTOMATIC CONTROL DEVICE
Filed Dec. 9, 1963  5 Sheets-Sheet 1
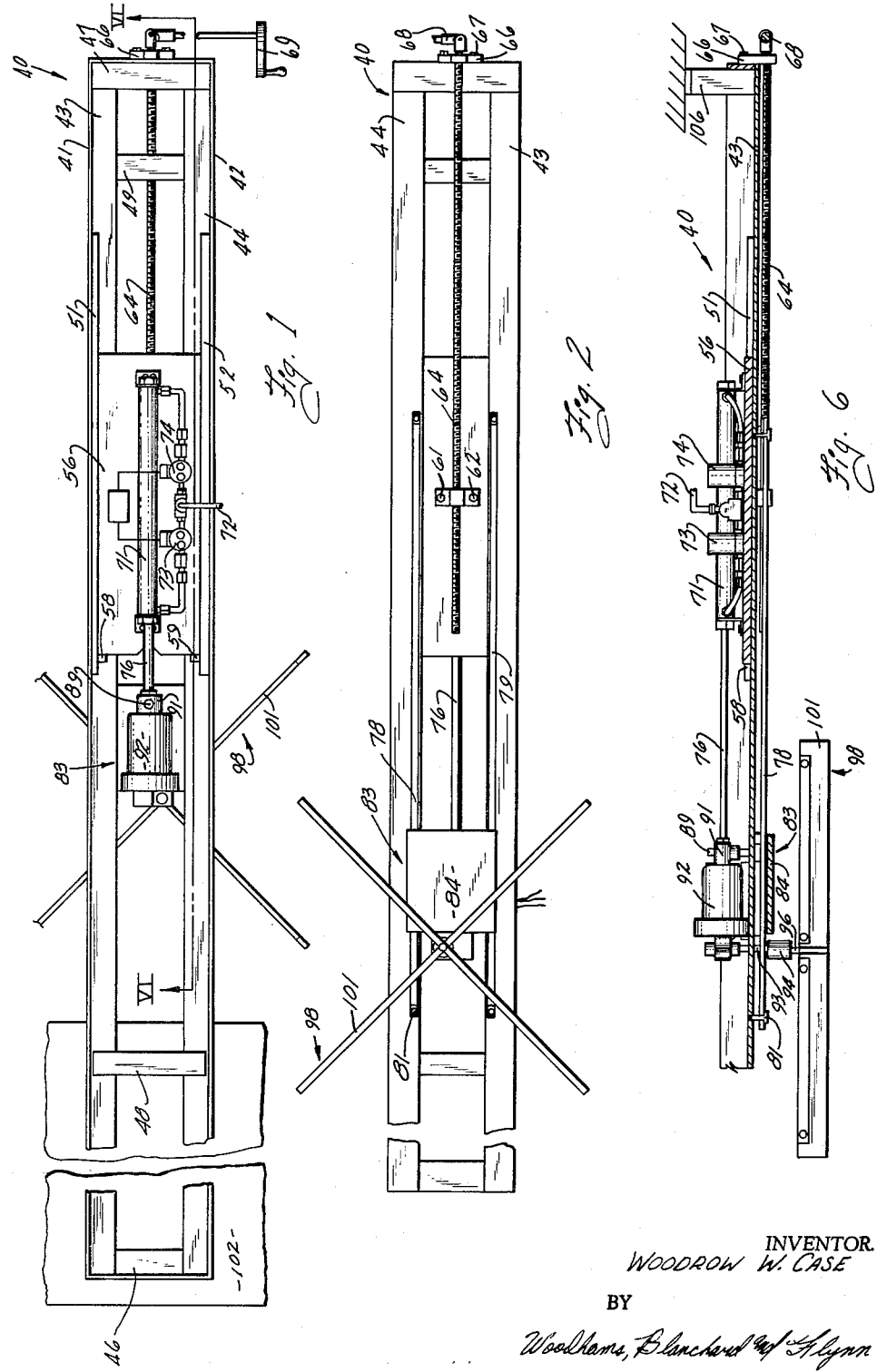
INVENTOR.
WOODROW W. CASE
BY
Woodhams, Blanchard and Flynn
ATTORNEYS

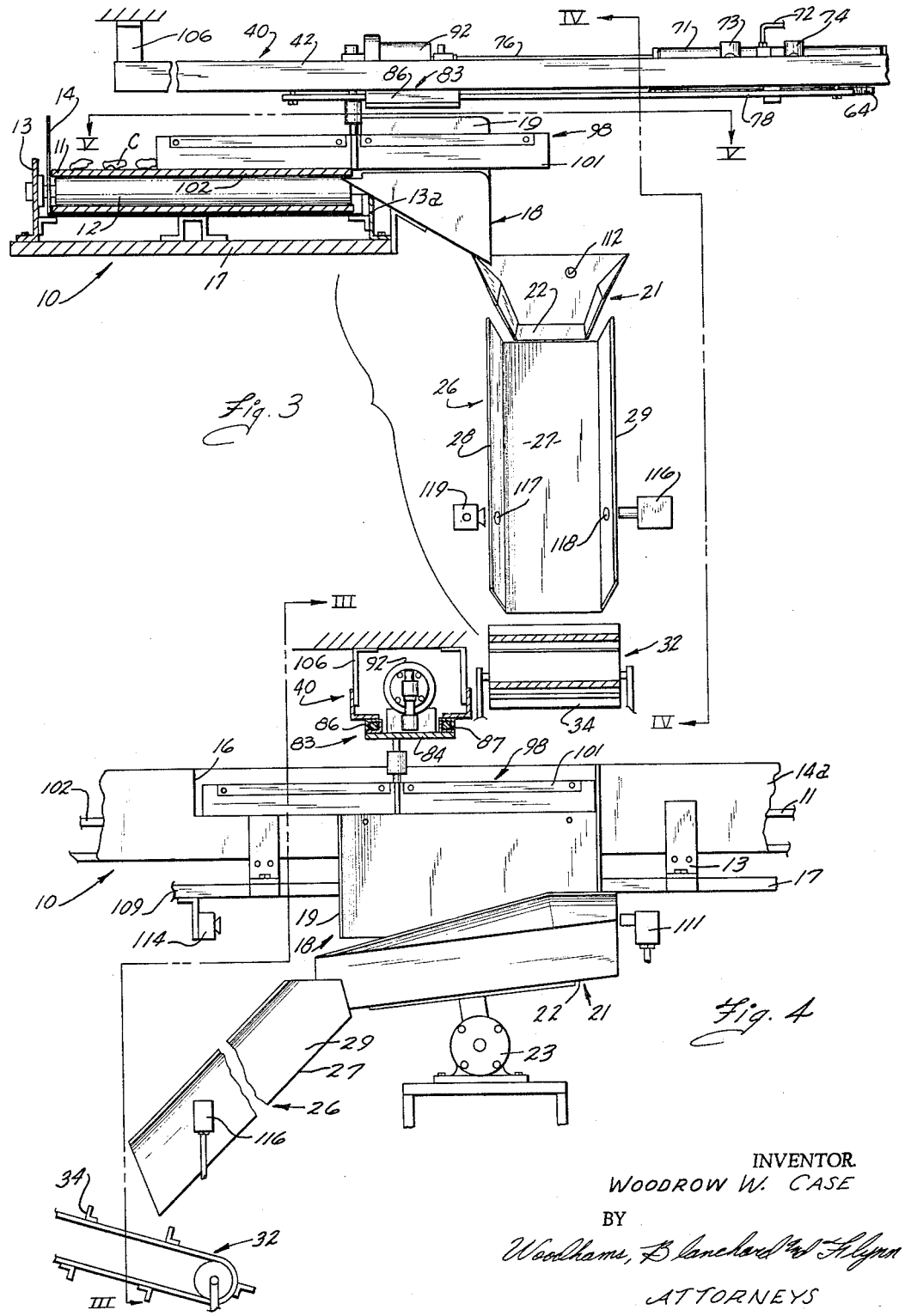

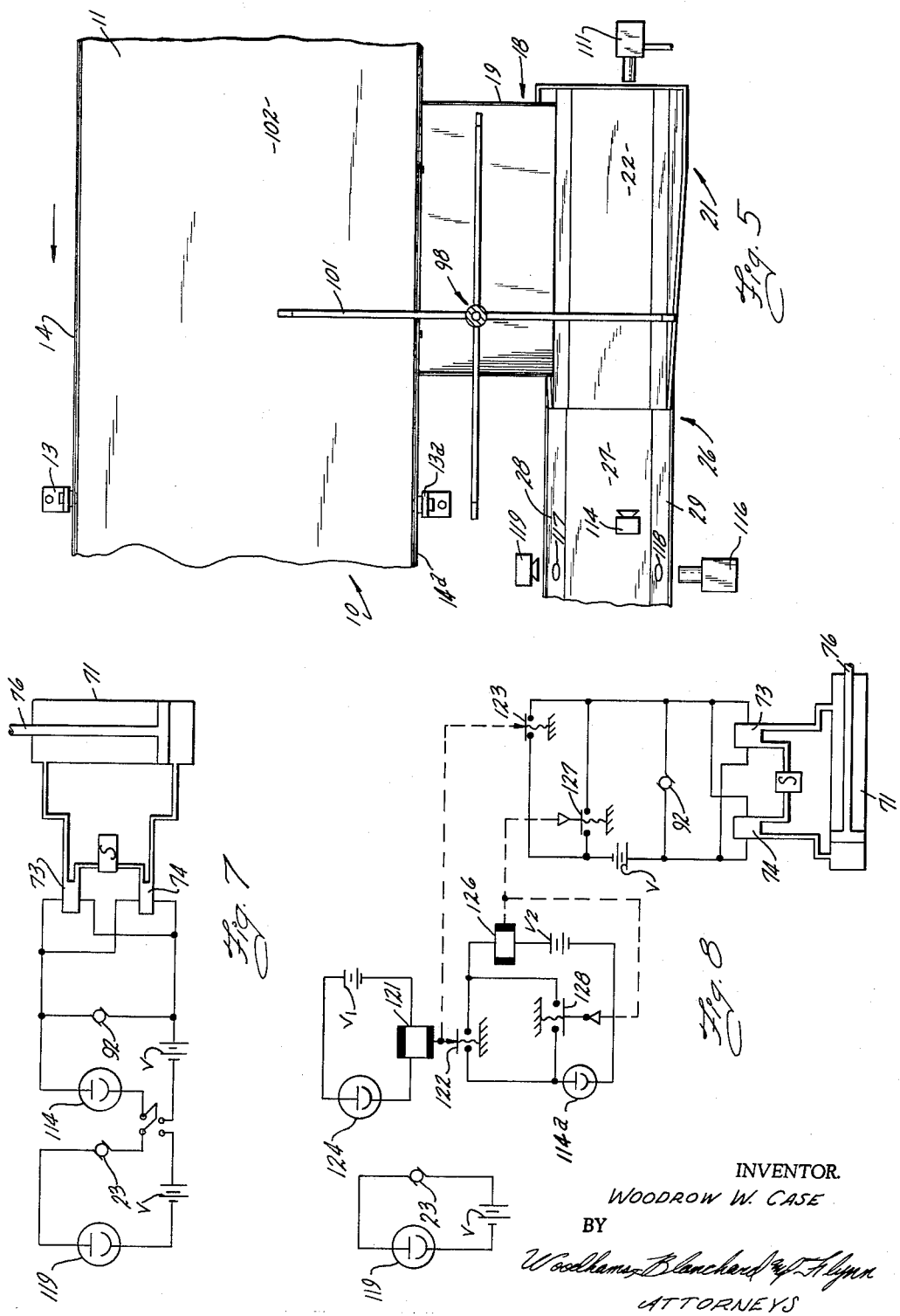

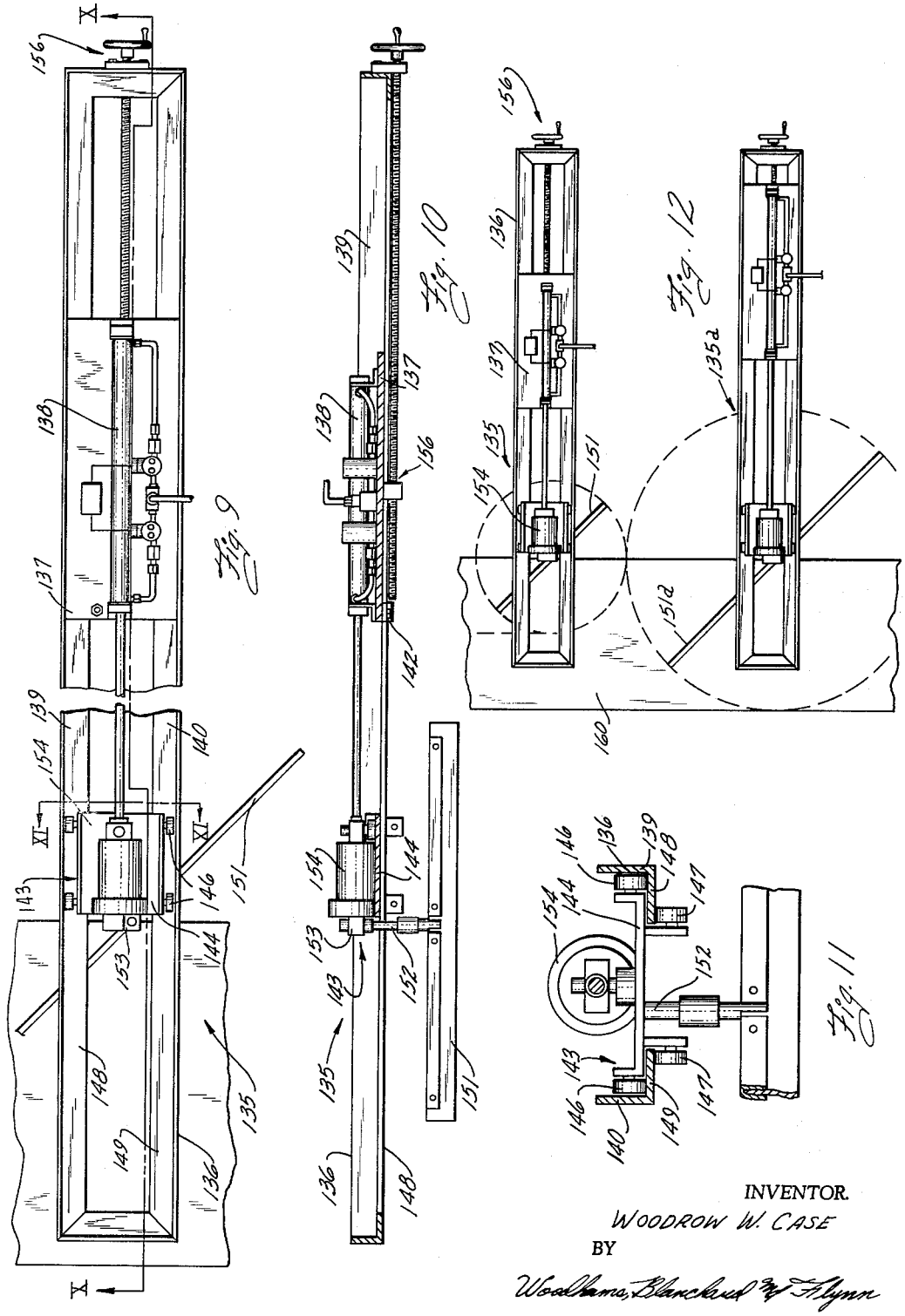

March 8, 1966  W. W. CASE  3,239,055
AUTOMATIC CONTROL DEVICE
Filed Dec. 9, 1963  5 Sheets-Sheet 5

INVENTOR.
WOODROW W. CASE
BY
Woodhams, Blanchard & Flynn
ATTORNEYS

United States Patent Office 3,239,055
Patented Mar. 8, 1966

3,239,055
AUTOMATIC CONTROL DEVICE
Woodrow W. Case, Kalamazoo, Mich., assignor to Be-Mo Machine Company, Kalamazoo, Mich., a corporation of Michigan
Filed Dec. 9, 1963, Ser. No. 329,059
7 Claims. (Cl. 198—37)

This invention relates in general to an apparatus for moving articles in automatically adjusted amounts from one zone to another and, more particularly, to a controllable apparatus for removing potato chips from a first conveyor and depositing them onto a second conveyor in predeterminable amounts which can be automatically adjusted, even to the extent of terminating the movement of the chips, in response to the occurrence of an abnormal flow of the chips away from the second conveyor.

The automatic handling of easily frangible materials, such as potato chips, has in the past, been at least frustrated, if not restricted, by several problems which seemed incapable of solution. For example, the chips must be constantly conveyed away from the chip fryer, which cannot be easily or economically turned on and off in response to the demand for a supply of chips. On the other hand, if a chip weighing or bag filling machine malfunctions, the chips will presently pile up at the machine and, as a general rule, fall on the floor where they are either damaged or contaminated. The broken chips, even if uncontaminated, result in a less desirable product, after the packaging is completed, and produce a messy and sometimes hazardous condition in the region of the packaging machine, because the fragments of the chips usually scatter over the floor. Thus, even though a very substantial economic gain could be achieved by using automatic machinery, manual labor is still widely used to avoid the substantial losses which are sustained by reason of excessive chip breakage, where automatic machinery has been used.

A substantial amount of chip congestion, hence breakage and mess, often occur at the point where a portion of the chips are removed from the conveyor, which carries the chips away from the frying machine, and fed into a packaging machine. One existing type of apparatus for effecting such chip removal includes mechanism for blowing the chips off of the conveyor and into a chute or hopper from which they are then directed into the bag filling machine. This blowing operation damages the chips and scatters the small chip fragments over the floor. Moreover, it lacks the capacity to control the amount of chips removed, and the rate of such removal, from the conveyor. That is, it must blow all or none of the chips off the conveyor. This apparatus seriously limits the effectiveness of the subsequent packaging machines along the conveyor which must rely for their operation upon chips received from such conveyor in a similar manner. That is, when several packaging machines demand chips at the same time some of them may get none.

In a very common, existing apparatus, a plow is mounted adjacent the upper surface of the conveyor for continuously selecting or removing a supply of chips from the belt. An experienced operator can usually set the plow in a position where it will remove about the proper amount of chips from the conveyor over a short period of time. Thus, by making periodic adjustments in the location of the plow, feeding of the chips to the bag filling machine can be maintained at a reasonably satisfactory level. However, if the bag filling machine is stopped for any reason for even a short period of time, or if the movement of the chips from the conveyor to the bag filling machine is obstructed, the plow continues to move chips off the conveyor so that they pile up at one or more places along the path of movement between the conveyor and the bag filling machine and, accordingly, spill out over the floor. Obviously, this results in a maintenance problem, time loss, chip loss and a messy condition around the apparatus. The maintenance losses referred to are those required to remove the plow until the breakdown can be repaired, unjamming the path between the conveyor and the bag filling machine and then resetting the plow in its proper position.

In view of the foregoing problems, among others, the need has become apparent for an apparatus whereby chips can be removed automatically from a conveyor in adjustable and predeterminable amounts in response to the need for such chips to supply a bag filling machine, such apparatus being capable of stopping automatically in the event that congestion or build-up of chips occurs at selected points along the said path, due to an obstruction in such path or a breakdown in the machinery.

Accordingly, the objects of this invention have been to provide:

(1) An apparatus for automatically removing frangible articles from a conveyor in response to the demand for such articles;

(2) An apparatus, as aforesaid, for automatically removing said articles from a conveyor and thereafter moving the said articles along a path from said conveyor to another machine in response to the demand created for said articles by said other machine, and for terminating the operation of said apparatus and moving it away from the conveyor in response to an abnormal build-up of the articles along the path between the conveyor and said other machine;

(3) An apparatus, as aforesaid, capable of removing potato chips from a conveyor carrying the potato chips away from a chip frying machine, said apparatus also being capable of moving into and out of a position for removing the chips from the conveyor in response to a demand for said chips by a bag filling machine;

(4) An apparatus, as aforesaid, which is completely automatic in operation, which can be easily adjusted either manually or automatically to provide a substantially constant flow of potato chips along the path from the chip carrying conveyor to the bag filling machine with a minimum of damage, if any, to the chips being moved along the path and with a minimum of maintenance, operator supervision and untidiness in the area of the machine;

(5) An apparatus, as aforesaid, which is economical to produce and operate, which requires a minimum of space so that it can be used with existing equipment for moving and packaging potato chips, which does not create any problems involving sanitation or contamination, and which can be adapted for use with conveyors in a great variety of sizes and capacities.

Other objects and purposes of this invention will become apparent to persons familiar with this type of equipment upon reading the following decriptive material and examining the accompanying drawings in which:

FIGURE 1 is a broken top plan view of an apparatus embodying the mechanical components of the invention.

FIGURE 2 is a broken, bottom view of said apparatus.

FIGURE 3 is a fragmentary, side elevational view of said apparatus in association with a conveyor and structure for guiding potato chips from a conveyor to a bag filling machine, not shown.

FIGURE 4 is a sectional view taken along the line IV—IV in FIGURE 3.

FIGURE 5 is a sectional view taken along the line V—V in FIGURE 3.

FIGURE 6 is a broken, sectional view taken along the line VI—VI in FIGURE 1.

FIGURE 7 is a diagram of an electrical circuit for operating the apparatus disclosed in FIGURE 1.

FIGURE 8 is a diagram of an alternate circuit for operating the apparatus disclosed in FIGURE 1.

FIGURE 9 is a top plan view of a modified apparatus embodying the invention.

FIGURE 10 is a sectional view taken along the line X—X in FIGURE 9.

FIGURE 11 is a sectional view taken along the line XI—XI in FIGURE 9.

FIGURE 12 is a top plan view of two cooperating apparatuses embodying the invention.

Figure 16:
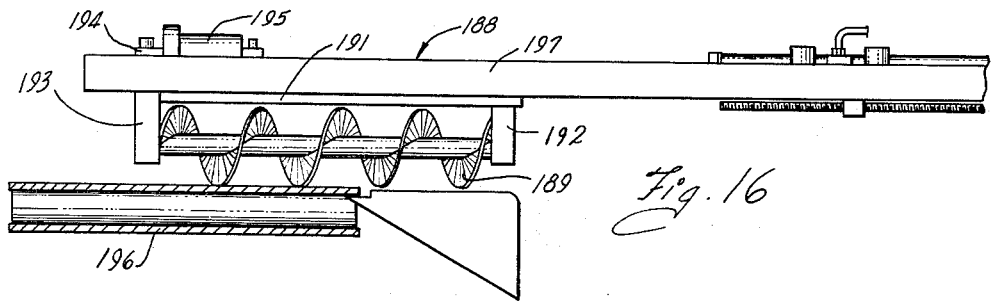
FIGURE 16 is a fragmentary side elevation view of a further modification of an apparatus embodying the invention.

For convenience in description, the terms "upper," "lower" and words of similar import will have reference to the structure of the invention and the machinery associated therewith as appearing in FIGURES 3 and 4. The terms "front," "rear" and words of similar import will have reference to the left and right ends, respectively, of the apparatus appearing in FIGURE 4. The terms "inner," "outer" and derivatives thereof will have reference to the geometric center of said apparatus and parts thereof or associated therewith.

*General construction*

The objects and purposes of the invention, including those set forth above, have been met by providing an apparatus which can be supported adjacent to and slightly above the carrying surface of a conveyor upon which the articles are moved along a path. The apparatus includes a carriage movable transversely of said path and a paddle wheel which is mounted upon said carriage and rotatable around an axis substantially perpendicular to the article supporting surface. The paddle wheel is selectively movable horizontally into and out of a position adjacent the article carrying surface where it can engage at least some of the articles on the surface and move them laterally into a chute or conveyor which delivers such articles to another operation, such as a bag filling machine.

It will be apparent from the modified constructions disclosed in detail hereinafter that there may be other specific devices which can be used in place of the paddle wheel for removing articles from a conveyor within the scope of the invention. That is, under some circumstances a screw-type device or a small endless conveyor may be used in place of the paddle wheel and supported for automatic or controlled movement into and out of the path of the articles being moved by the conveyor. Also it will be recognized that multiples of the paddle wheel or its equivalent can be stationed along the conveyor for simultaneously removing said articles from different portions of the conveyor.

The apparatus includes a control mechanism, such as an electrical circuit having light sensitive cells, which prevents a loss producing build-up of said articles along the path of movement of the articles between the conveyor and said packaging machine. Said control device can also be used to vary automatically the amount of articles being removed by the apparatus from the conveyor in response to the demands of said packaging machine.

*Detailed description*

Apparatus typically used in conveying potato chips from a fryer (not shown) includes a horizontally disposed conveyor mechanism 10 including an endless conveyor belt 11 (FIGURES 4 and 5) the carrying surface of which moves, in this embodiment, from right to left.

The belt 11 is supported upon rollers 12 (FIGURE 3) which are rotatably supported by fixed brackets 13 and 13a. The belt 11 is disposed within a channel-shaped member 15 which is supported by the brackets 13 and 13a upon the conveyor supports 17. Said channel member 15 has side flanges 14 and 14a which are adjacent to the lateral edges of the conveyor 11 and thereby prevent accidental displacement of chips from the belt 11.

An opening 16 (FIGURE 4) in the side flange 14a permits movement of chips C from the belt 11 into a downwardly sloping, upper chute 18, which has sides 19. A suitable receptacle 21, such as a hopper with the top and front sides removed therefrom, is supported below the discharge end of the chute 18 for receiving chips therefrom. The receptacle 21 preferably has a downwardly and frontwardly sloped bottom 22, which may be supported upon a vibrator motor 23 or the like to vibrate the receptacle 21, whereby the contents of the receptacle 21 are emptied into a downwardly sloping lower chute 26, having a sloping bottom member 27 and side walls 28 and 29.

The chute 26 (FIGURE 4) empties into a feeder conveyor 32 which is here shown, for purposes of illustration, to consist of an endless belt conveyor having a plurality of feed lugs 34 fixed thereto for assuring the movement of chips deposited thereon. The feeder conveyor 32 in a particular installation supplies a chip packaging machine (not shown). The apparatus described hereinabove is known in the art and may be considered a typical environment for use of the embodiment of the invention hereinafter described.

The apparatus 39 of the invention includes an elongated, generally rectangular frame 40 (FIGURES 1 and 2) including a pair of preferably parallel side members 41 and 42, which may be structural members having coplanar flanges 43 and 44, respectively, for the sake of rigidity. The side members 41 and 42 are connected by the end members 46 and 47, and may be connected by intermediate members 48 and 49. The various members comprising the frame 40 which are preferably made from steel, may be connected in any convenient manner, such as by welding.

A pair of spaced and parallel rods 51 and 52 are secured, as by welding, to the side members 41 and 42 so that said rods are spaced from the upper sides of the flanges 43 and 44 adjacent the outer edges thereof. A cylinder support plate 56 rests slidably upon the upper surfaces of the flanges 43 and 44 beneath and in sliding contact with the rods 51 and 52 whereby said plate 56 can be moved longitudinally but not transversely of the frame 40. Stops 58 and 59 are secured to said flanges 43 and 44 adjacent the leftward (FIGURE 1) ends of the rods 51 and 52, respectively, for limiting the leftward movement of the plate 56.

An internally threaded bracket 61 (FIGURE 2) is fixed to the under side of the support plate 56 by the screws 62. An elongated, threaded shaft 64 is supported lengthwise of the frame 40 below the plate 56 so that the leftward end of said shaft is threadedly engaged within the threaded bracket 61. The rightward end of the threaded shaft 64 is rotatably supported and held against axial movement by a bearing 66 which is connected to the end member 47 by the screws 67. Rotation of the crank 69, which is connected to the threaded shaft 64 by means including the universal joint 68, causes the plate 56 to be moved longitudinally of the frame 40.

A double-acting pressure cylinder 71 (FIGURE 1) is supported upon the upper side of the plate 56. A source of pressure fluid S (FIGURES 7 and 8) is connected by a conduit 72 to a pair of solenoid valves 73 and 74, which are in turn connected respectively to the opposite ends of the pressure cylinder 71. The cylinder 71 has a leftwardly extending piston rod 76 which is movable longitudinally of the frame 40 in response to suitable energization of the solenoid valves 73 and 74.

The flanges 43 and 44 (FIGURE 2) of the frame 40, respectively, support spaced and parallel guide rails 78 and 79, which are spaced downwardly from the frame 40. The guide rails 78 and 79 are secured at the ends thereof to the flanges 43 and 44 by the screws 81. The guide rails 78 and 79 are, in this embodiment, a pair of cylindrical rods.

The carriage 83 (FIGURES 2 and 6) has a horizontal plate 84 (FIGURE 4) with a pair of spaced elongated and parallel sleeves 86 and 87, which are secured to said plate 84 by welding. The guide rails 78 and 79 are respectively and slidably received through the sleeves 86 and 87 when the carriage 83 is correctly supported upon the frame 40. Thus, the carriage 83 may be moved along said guide rails longitudinally of the frame 40.

The carriage 83 (FIGURE 6) supports on the upper surface thereof a post 89 which is attached by means of a suitable clamp 91 to the leftward end of the piston rod 76 of the pressure cylinder 71, whereby reciprocation of said piston rod causes a corresponding reciprocation of the carriage 83 along the guide rails 78 and 79.

The carriage 83 (FIGURE 6) also supports a gear motor 92 having a vertical output shaft 93. The output shaft 93 is releasably and axially adjustably connected by a coupling 94 to the drive shaft 96 of a paddle wheel 98 having a plurality, here four, of blades 101. The paddle wheel 98 is advantageously revolved at a relatively slow rate of speed, and the lower edges of the blades preferably lie substantially within the plane defined by the upper surface of the upper reach 102 of the belt 11. Thus, movement of the piston rod 76 by the pressure cylinder 71 effects a corresponding movement of the paddle wheel 98 transversely of the reach 102 and along the longitudinal axis of the frame 40.

Suitable hanger brackets 106 are fixed to the frame 40, as by welding, and are secured to any convenient fixed structure, adjacent the conveyor 11, such as the ceiling of the room within which said conveyor 11 is housed. The frame 40 is preferably installed so that its lengthwise axis extends substantially perpendicularly to the direction of motion of the conveyor reach 102. Thus, by operation of the cylinder 71, the paddle wheel 98 can be shifted from its maximum operating position of FIGURE 3, wherein the center of said paddle wheel is located adjacent the edge of the conveyor 11 to its minimum operating position of FIGURE 1 wherein the paddle wheel 98 is disposed sidewardly of the conveyor 11. It will be seen that the paddle wheel 98 can be located in a variety of intermediate operating positions, one of which is shown in FIGURE 5, to adjust the output of the apparatus.

The lower edges of the blades 101 of the paddle wheel 98 preferably sweep, gently to reduce wear, the adjacent upper surface of the conveyor reach 102, whereby chips or other objects carried on said conveyor will be engaged by the blades 101, when the paddle wheel 98 is located in an operating position. The opening 16 (FIGURE 4) is preferably slightly larger than the diameter of the paddle wheel 98 and the chute 18, which is somewhat narrower than said opening 16, is located adjacent the rearward end of the opening 16. Thus, the paddle wheel 98 is rotated in a clockwise direction, as appearing in FIGURE 5, so that its blades meet the approaching chips and sweep them into the chute 18. The chute 18 is preferably somewhat wider than the length of one of the blades 101 of the paddle wheel 98 so that losses of chips can be prevented.

Means controlling the translation and rotation of the paddle wheel 98 include a light source 111 fixed at the rearward side (FIGURES 4 and 5) of the receptacle 21 and aimed horizontally, through a suitable hole 112 in the rear end wall of said receptacle near the upper edge thereof, at a photocell 114, which may be mounted upon a conveyor support 17 by a bracket 109. A further light source 116 is fixed near the lower end of the chute 26 and is aimed, through holes 117 and 118 (FIGURE 5) in the side walls 28 and 29, respectively, of the chute 26. The light beam from source 116 impinges upon a photocell 119 fixed with respect to the chute 26 on the opposite side of said chute from the light source 116.

Referring to FIGURE 7, the photocell 114 is arranged and connected to control the application of operating voltage from a source V to the gear motor 92. The photocell 116 also controls the operation of the pressure cylinder 71. The photocell 116 is arranged to control the operation of the vibration motor 23. Thus, if the beam of light directed from the source 111 at the photocell 114 is blocked for a significant period of time, the motor 92 is de-energized and the cylinder 71 is operated so that the paddle wheel 98 is moved into its FIGURE 1 position. If the beam of light from the source 116 is blocked for a substantial period of time, the photocell 119 de-energizes the vibrator motor 23. Brief interruptions of the light beams from the sources 114 and 116, as when a chip accidentally passes through the beam, will not be sufficient to stop the motors 23 and 92 or to operate the cylinder 71.

*Operation*

Assuming the conveyor 11 to be carrying chips from a frying machine, for example, in a leftwardly direction as indicated by the arrow in FIGURE 5, the operation of the apparatus 39 is commenced by connecting the light sources 111 and 116 to the sources V of electrical potential, whereby the photocells 114 and 119, respectively, are energized.

Energization of the photocell 119 completes the circuit to the motor 23 whereby the receptacle 21 is caused to vibrate. Energization of the photocell 114 completes the circuit to the gear motor 92 whereby the paddle wheel 98 is rotated. Energization of the photocell 114 also completes the circuit through one of the solenoid valves 73 and 74 whereby movement of the piston rod 76 by the pressure cylinder 71 is effected to move the paddle wheel 98 leftwardly, as seen in FIGURE 3, toward its operating position over the conveyor belt 11. Such translation of the paddle wheel 98 is limited by the location of the cylinder support plate 56 on the frame 40. The position of the paddle wheel 98 can be adjusted with respect to the conveyor belt 11, if it is not satisfactory, by turning the crank 69, which rotates the threaded shaft 64 whereby the plate 56 is moved along the frame 40. Hence, the working position of the paddle wheel 98 with respect to the conveyor belt 11 can be precisely adjusted.

The paddle wheel 98 preferably rotates so that the blades 101 sweep along upper reach 102 of the belt 11 relatively slowly in a direction generally opposite to the direction of motion of the reach 102. Thus, as appearing in FIGURE 5, the paddle wheel 98 sweeps the chips off of said reach 102 and into the chute 18. The chute 18 has a sufficiently steep angle of inclination that the chips will slide downwardly thereon into the receptacle 21.

Normally the vibration of the receptacle 21 is sufficient to maintain the level of the chips therein below the opening 112. Under these conditions, the paddle wheel 98 will continue to move chips through the chute 18 into the receptacle. Moreover, the receptacle 21 will deliver a continuous stream of chips to the chute 26 which, is inclined so that the chips slide downwardly thereon and onto the feeder conveyor 32. The feeder conveyor 32 moves the chips to a suitable packaging machine (not shown) where the chips are packaged.

If for any reason, such as a malfunction in the operation of the conveyor 32, the chips pile up in the lower end of the chute 26 so that they block the light beam from the light source 116, the photocell 119 is de-energized and thereby shuts off the vibrator motor 23 so that the receptacle 21 stops emptying chips into the chute 26. Thus, the level of chips in the chute 26 rises no further and chip spillage and other inconveniences are eliminated.

Unblocking of the light source 116 allows the photocell 119 to turn on the vibrator motor, whereby normal operation is resumed.

If the pile up of chips in the chute 26 is not eliminated promptly the level of chips will rise in the receptacle 21 until said chips block the beam of light from the source 111. Accordingly, the afore-mentioned stoppage of the vibrator motor 23 or incorrect setting of the location of the paddle wheel 98 with respect to the conveyor 11 the photocell 114 will be de-energized and will shut off the gear motor 92, which stops the rotation of the paddle wheel 98, and will operate the solenoid valves 73 and 74 to retract the piston rod 76, whereby the paddle wheel 98 is moved off the conveyor belt 11. Hence, no more chips will be moved into the receptacle 21 from the conveyor belt 11, and spillage of chips from the chute 18 or receptacle 21 is effectively prevented.

When the chips are removed from the receptacle 21, as by resuming the operation of the vibrator motor 23 the paddle wheel 98 is automatically returned to its former position over the conveyor belt 11 and rotation thereof is resumed, as hereinabove described. Hence, the apparatus automatically turns itself off when an overflow condition is threatened and automatically turns itself on again when the threat of such condition is removed. An incorrect, initial setting of the position of the paddle wheel 98 with respect to the conveyor 11, whereby the receptacle 21 is oversupplied, is easily detected because it causes the paddle wheel to be moved out of the operating position too frequently.

By appropriate mechanism, the threaded shaft 64 can be caused to adjust the location of the operating position of the paddle wheel 98 over the belt 11 in response to the frequency of movement of said wheel into and out of its operating position. However, the threaded shaft 64 can be manually adjusted by the handle 69 so that translation of the carriage 83 is minimized. Some translation of the carriage, hence the paddle wheel 98, is desirable because it prevents the occurrence of an insufficient supply. The apparatus may be shut down by turning off the light sources 111 and 116 and/or by shutting off the voltage sources V (FIGURE 7).

*Modifications*

FIGURE 8 discloses a modified control circuit in which the photocell 119 controls the application of voltage from a source V to the vibrator motor 23, as in FIGURE 7. The circuit of FIGURE 8 includes a photocell 124 which is preferably placed below the location of the photocell 114, shown in FIGURE 3, to control the current flow from a source $V_1$ to a suitable relay coil 121 to close the contacts 122 and 123. The contacts 123 control current flow to the gear motor 92 and solenoid valves 73 and 74. The photocell 114a is in series with a source of voltage $V_2$, the contacts 122 and a relay coil 126 having contacts 127 in parallel with said contacts 123, and having contacts 128 in parallel with said contacts 122.

The photocells 114a and 124 operate to maintain the level of chips in the receptacle 21 between the light beams directed at said photocells. Assuming that the receptacle 21 is empty and the paddle wheel 98 is operating so as to direct chips into said receptacle, the level of said chips can rise past the level of the photocell 124 to de-energize the relay coil 121 and open the relay contacts 122 and 123. The photocell 114a is still illuminated and, therefore, the relay coil 126 is still energized to maintain the contacts 127 and 128 closed, whereby current still flows through the gear motor 92 and to the solenoid valves 73 and 74. When the chips reach a level where they block the photocell 114a, the relay coil 126 is de-energized and the contacts 127 and 128 are opened so that the gear motor 92 is shut off and the piston rod 76 is retracted, whereby chips are no longer added to the receptacle 21. As the chips are again lowered in the receptacle 21 as the result of the vibration of the vibrator motor 23, the photocell 114a is again exposed to light. However, since the contacts 128 and 122 are open, no current flows through the photocell 114a and therefore, the paddle wheel 98 remains de-energized. When the chip level falls below the lower photocell 124, said photocell 124 is energized and conducts through the relay coil 121 to close the contacts 122 and 123, thereby causing the paddle wheel 98 to rotate and move over the belt 11. Closure of the contacts 122 allows condition through the photocell 114a and relay coil 126 which causes closure of the contacts 127 and 128. Thus, when the chips in the receptacle 21 again reach the maximum level defined by the upper photocell 114a, the relay coils in the FIGURE 8 circuit will again be cycled in the manner described in the foregoing paragraphs whereby the apparatus of the invention is stopped until the chips reach the minimum level in the receptacle 21, whereupon the said apparatus is started again.

This type of control is well suited to use with a relatively large hopper, which is used in place of the receptacle 21, and results in periodic operation of the paddle wheel 98.

It will be seen that the apparatus of the invention can be supported upon the conveyor mechanism 10 or upon the floor, if desired, by supplying suitable mounting structure.

FIGURES 9, 10 and 11 illustrate a modified apparatus 135 having a frame 136 which is similar to and supported like the frame 40 of the apparatus 39 shown in FIGURE 1. However, the apparatus 135 is simplified in that the plate 137 supporting the pressure cylinder 138 is held in position upon and between the side elements 139 and 140 of the frame 136 by means of the guide bar 142 (FIGURE 10).

The apparatus 135 also differs from the apparatus 39 in that the motor carriage 143 is comprised of a plate 144 which is movably mounted upon the side elements 139 and 140 by means of small rollers 146 and 147, which engage the upper and lower sides, respectively, of the horizontal flanges 148 and 149 on the side elements 139 and 140.

A single paddle blade 151 (FIGURE 10) is connected by a shaft 152 to the gear box 153 for rotation by the motor 154 in a manner similar to the operation of the paddle wheel 98 of FIGURE 2. The adjusting mechanism 156 may be similar to the corresponding mechanism (FIGURE 6) on the apparatus 39.

The operation of the apparatus 135 (FIGURE 9) is, at least in substance, substantially identical with the operation of the apparatus 39 shown in FIGURE 1. However, and generally speaking, the apparatus 135 is less complicated, somewhat lighter in weight and particularly designed to perform lighter duty than the apparatus 39 in FIGURE 1.

FIGURE 12 illustrates a pair of apparatuses 135 and 135a which are both operated in association with the same conveyor belt 160 which carries the articles, such as potato chips, toward the two apparatuses. The single paddle blade 151 of the apparatus 135 is somewhat shorter than the single blade 151a. Thus, the apparatus 135 is normally placed upstream of the apparatus 135a so that the blade 151 cannot remove all of the articles from the conveyor belt 160, regardless of its position. Accordingly, the apparatuses 135 and 135a can be operated at the same time and can both remove articles from the conveyor belt.

In accordance with the descriptive material set forth above with respect to the apparatus 39, both of the apparatuses 135 and 135a will normally be arranged for independent movement into and out of article removing positions adjacent the upper surface of the conveyor belt 160. Such operation may be governed automatically by controls which are responsive to the need for the removal of such articles from the conveyer belt.

Figure 13:
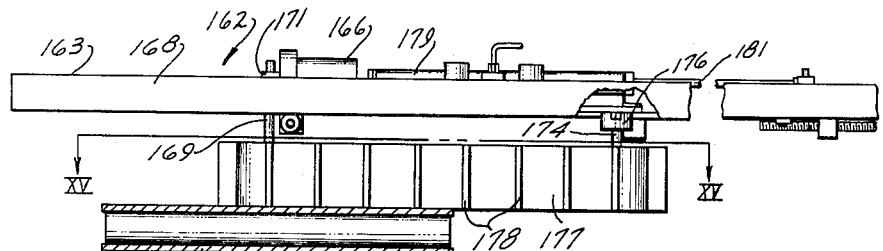
FIGURE 13 is a fragmentary and broken side elevation view of a modified construction for the apparatus of the invention.
Figure 14:
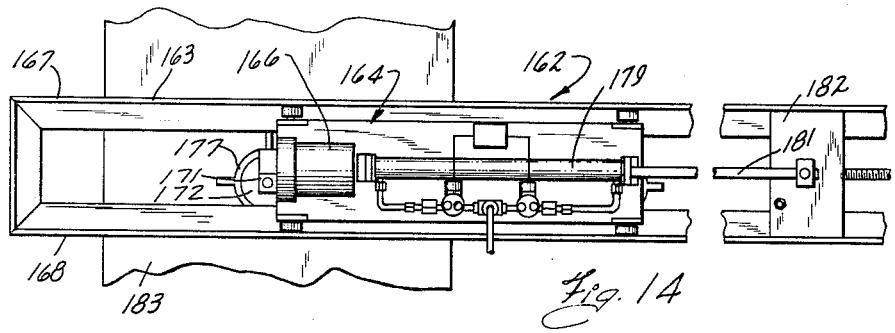
FIGURE 14 is a fragmentary broken top plan view of the modified apparatus shown in FIGURE 13.
Figure 15:
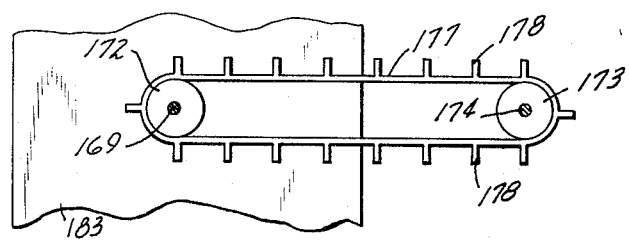
FIGURE 15 is a sectional view taken along the line XV—XV in FIGURE 13.

FIGURES 13, 14 and 15 illustrate a modified apparatus 162 having a frame 163 which is preferably substantially identical with the frame 40 of the apparatus 39 (FIGURE 1). In this particular embodiment, the carriage 164, which supports the motor 166 and which is supported upon the side elements 167 and 168 of the frame 163, is somewhat longer than the carriage 83 (FIGURE 1). The shaft 169, which extends downwardly from the gear box 171 on the motor 166, supports a roll 72. Another roll 173 is mounted upon a shaft 174 which is rotatably supported by the bearing device 176 upon the carriage 164. An endless sweep belt 177 having outwardly extending ribs 178 extends snugly around the rolls 172 and 173 for controlled movement by the motor 166.

An air cylinder 179 (FIGURE 14) which may be arranged and controlled in a manner similar to the air cylinder 71 (FIGURE 1), is mounted upon the carriage 164. The piston rod 181 (FIGURE 14) is connected at its outer end to a mounting plate 182 which is adjustably held in a fixed position upon and between the side elements 167 and 168 of the frame 163. The adjustment of the mounting plate 182 along the frame 163 may be accomplished substantially in the same manner as set forth in detail above with respect to the adjustment mechanism 156 (FIGURE 10).

The sweep belt 177 (FIGURE 13) is arranged so that its lower edge is closely adjacent the upper surface of the conveyor belt 183 and so that its two reaches are substantially parallel with each other and transverse of (usually perpendicular to) the direction of movement of the upper reach of the conveyor belt 183. The entire sweep belt 177 is moved in a lengthwise direction with the carriage 164 in a manner and for the purpose substantially as set forth above with respect to corresponding movement of the paddle wheel 98 (FIGURE 1).

FIGURE 16 illustrates a modified apparatus 188 which may be relatively similar to the apparatus 162 of FIGURE 13, except that the sweep belt 177 and its supporting rolls 172 and 173 are replaced by an auger or screw conveyor 189. That is, the screw conveyor 189 is rotatably supported at one end upon the carriage plate 191 by a bearing 192 and at the other end by a gear box 193, which is connected to the gear box 194 on the motor 195. Accordingly, rotation of the motor 195 causes the screw conveyor 189 to rotate in an appropriate direction whereby materials disposed upon the conveyor belt 196 are intercepted by the screw conveyor 189 and moved off of said conveyor belt 196. The carriage plate 191 and parts supported thereon may be moved lengthwise of the frame 197 in a manner similar to that discussed above with respect to the movement of the carriage 164 along the frame 163 (FIGURE 14).

Although particular preferred embodiments of the invention have been disclosed hereinabove for illustrative purposes, variations or modifications of such disclosure lying within the scope of the appended claims are fully contemplated.

What is claimed is:

1. An apparatus for removing articles from a substantially horizontal surface defining a path along which said articles are moved in a substantially horizontal direction, comprising:
   a frame structure near said surface;
   carriage means supported by said frame structure for movement transversely of the path of movement of said articles;
   removal means mounted on said carriage means above a plane defined by said surface for movement with respect to said carriage means, at least part of said movement of said removal means being closely adjacent said surface and capable of moving said articles transversely of said surface;
   means on said carriage means for effecting said movement of said removal means;
   actuating means for effecting said traverse movement of said carriage means between a first position, wherein said removal means is moved along said surface and a second position spaced from said first position transversely of said path; and
   control means responsive to the quantity of articles moved transversely of said surface by said removal means for effecting the operation of said actuating means.

2. An apparatus for removing articles from a substantially horizontal surface defining a path along which said articles are moved in a substantially horizontal direction, comprising:
   a frame structure near said surface;
   carriage means supported by said frame structure for movement transversely of the path of movement of said articles;
   paddle wheel means mounted on said carriage means adjacent to and above a plane defined by said surface for movement with respect to the carriage means around an upright axis transverse of said path;
   means supported on said carriage means for effecting said movement of said paddle wheel means so that the portion of said paddle wheel means which is engaging said articles is moving primarily in a direction opposite to the direction of movement of said articles;
   actuating means for effecting said traverse movement of said carriage means between a first position, wherein said paddle wheel means is moved along said surface so that it is able to remove articles from said path, and a second position spaced from said first position transversely of said path; and
   control means responsive to the quantity of articles moved transversely of said surface by said paddle wheel means for effecting the operation of said actuating means.

3. An apparatus according to claim 1 wherein said removal means is an endless belt having a pair of substantially parallel reaches disposed transversely of said path and adjacent said surface, said belt being supported upon said carriage means and having outwardly projecting ribs extending transversely of said reaches and upwardly from said surface.

4. An apparatus according to claim 1 wherein said removal means includes screw means supported by said carriage means for rotation around an axis substantially parallel with said surface and transverse of said path, the lower surface of said screw being closely adjacent said plane.

5. An apparatus for removing a quantity of articles from a conveyor, by which said articles are moved along a substantially horizontal path into a receptacle, comprising:
   a frame structure and means supporting same near said path;
   a carriage supported upon said frame structure for substantially horizontal movement transversely of and above said path;
   a paddle wheel supported upon said carriage adjacent to and above a substantially horizontal plane defined by said conveyor for rotation around an axis substantially perpendicular to said plane, said paddle wheel being movable with said carriage between a first position, wherein the paddles of said paddle wheel are moved along said conveyor in a direction substantially opposite to the direction of movement of the articles along said path and the axis of rotation is adjacent one edge of said path, and a second position wherein said paddle wheel is offset laterally from said path;
   an electric motor for rotating said paddle wheel when it is in said first position so that said articles are engaged by the paddles and moved into the receptacle; and a control device associated with said receptacle for moving said paddle wheel between said first and second positions in response to the quantity of articles in said receptacle.

6. An apparatus for removing a quantity of articles from a conveyor, by which said articles are moved along a substantially horizontal path into a receptacle, which slopes toward one end thereof, comprising:

a frame structure and means supporting same near said path;

a carriage supported upon said frame structure for substantially horizontal movement transversely of and above said path;

a paddle wheel supported upon said carriage adjacent to and above a substantially horizontal plane defined by said conveyor for rotation around an axis substantially perpendicular to said plane, said paddle wheel being movable with said carriage between a first position, wherein the paddles of said paddle wheel are moved along said conveyor in a direction substantially opposite to the direction of movement of the articles along said path, and a second position wherein said paddle wheel is offset laterally from said path;

means for rotating said paddle wheel when it is in said first position so that said articles are engaged by the paddles and moved into the receptacle;

a chute extending downwardly from a point beneath said one end of said receptacle;

means for vibrating said receptacle whereby said articles are moved toward said one end thereof and into said chute;

a first control device associated with said receptacle for moving said paddle wheel between said first and second positions in response to the quantity of articles in said receptacle; and a second control device associated with said chute for starting and stopping the operation of said vibrating means in response to the movement of said articles along said chute.

7. An apparatus for removing a quantity of articles from a conveyor, by which said articles are moved along a substantially horizontal path into a receptacle, comprising:

a frame structure and means supporting same near said path, said frame structure including a plate and adjustment means for changing the location of said plate with respect to said supporting means in a direction substantially parallel with the direction of movement of said carriage;

a carriage supported upon said frame structure for substantially horizontal movement transversely of and above said path;

pressure fluid actuating means supported upon said plate and connected to said carriage for effecting said movement of said carriage;

a paddle wheel supported upon said carriage adjacent to and above a substantially horizontal plane defined by said conveyor for rotation around an axis substantially perpendicular to said plane, said paddle wheel being movable with said carriage between a first position, wherein the paddles of said paddle wheel are moved along said conveyor in a direction substantially opposite to the direction of movement of the articles along said path, and a second position wherein said paddle wheel is offset laterally from said path;

means for rotating said paddle wheel when it is in said first position so that said articles are engaged by the paddles and moved into the receptacle; and a control device associated with said receptacle for operating said pressure fluid actuated means in response to the quantity of articles in said receptacle.

References Cited by the Examiner

UNITED STATES PATENTS

| | | | |
|---|---|---|---|
| 1,716,968 | 6/1929 | May | 198—185 X |
| 2,530,074 | 11/1950 | Parisi | 198—188 |
| 3,045,801 | 7/1962 | Graybeal | 198—185 |

FOREIGN PATENTS 538,002    11/1931    Germany.

SAMUEL F. COLEMAN, *Primary Examiner.*

WILLIAM B. LABORDE, *Examiner.*